United States Patent [19]

Dudzik et al.

[11] 4,270,968

[45] Jun. 2, 1981

[54] LABELLING DEVICE

[76] Inventors: Windfried Dudzik, Drosselweg 13, 7441 Neckartailfingen; Joachim Dudzik, Vor dem Klingler 1, 7440 Nürtingen, both of Fed. Rep. of Germany

[21] Appl. No.: 127,313

[22] Filed: Jun. 2, 1980

[30] Foreign Application Priority Data

Mar. 12, 1979 [DE] Fed. Rep. of Germany ....... 2909655

[51] Int. Cl.[3] ............ B32B 1/00

[52] U.S. Cl. ............ 156/361; 156/542; 156/584

[58] Field of Search ........ 156/361, 362, 363, 540–542, 156/566, 584; 221/73; 226/32, 45

[56] References Cited

U.S. PATENT DOCUMENTS

| | | | |
|---|---|---|---|
| 2,920,780 | 1/1960 | Hauschild et al. | 156/361 |
| 3,779,829 | 12/1973 | Wolff | 156/361 |
| 3,953,278 | 4/1976 | Smith et al. | 156/541 X |
| 4,188,252 | 2/1980 | Brown | 156/361 |

*Primary Examiner*—David A. Simmons
*Attorney, Agent, or Firm*—Toren, McGeady and Stanger

[57] ABSTRACT

In a device for the automatic labelling of objects moved past the device, a ribbon carrying self-adhesive labels in a spaced relationship is pulled in a stepwise manner from a pull-off roll over a dispensing edge to a take-up roll. The advancing mechanism for the ribbon contains a ribbon clamping device which moves back and forth. In the normal case, the advance of the ribbon is controlled by a sensing device responding to control markings on the label ribbon and, in the case individual control markings are missing, the advance is controlled through a limit switch actuated by the mobile ribbon clamping device. A step-up gear unit is arranged between the pull-off roll and the take-up roll and a slipping clutch ensures an especially simple and effective drive of the take-up roll and the generation of the required ribbon tension.

12 Claims, 7 Drawing Figures

LABELLING DEVICE

Figure 1:
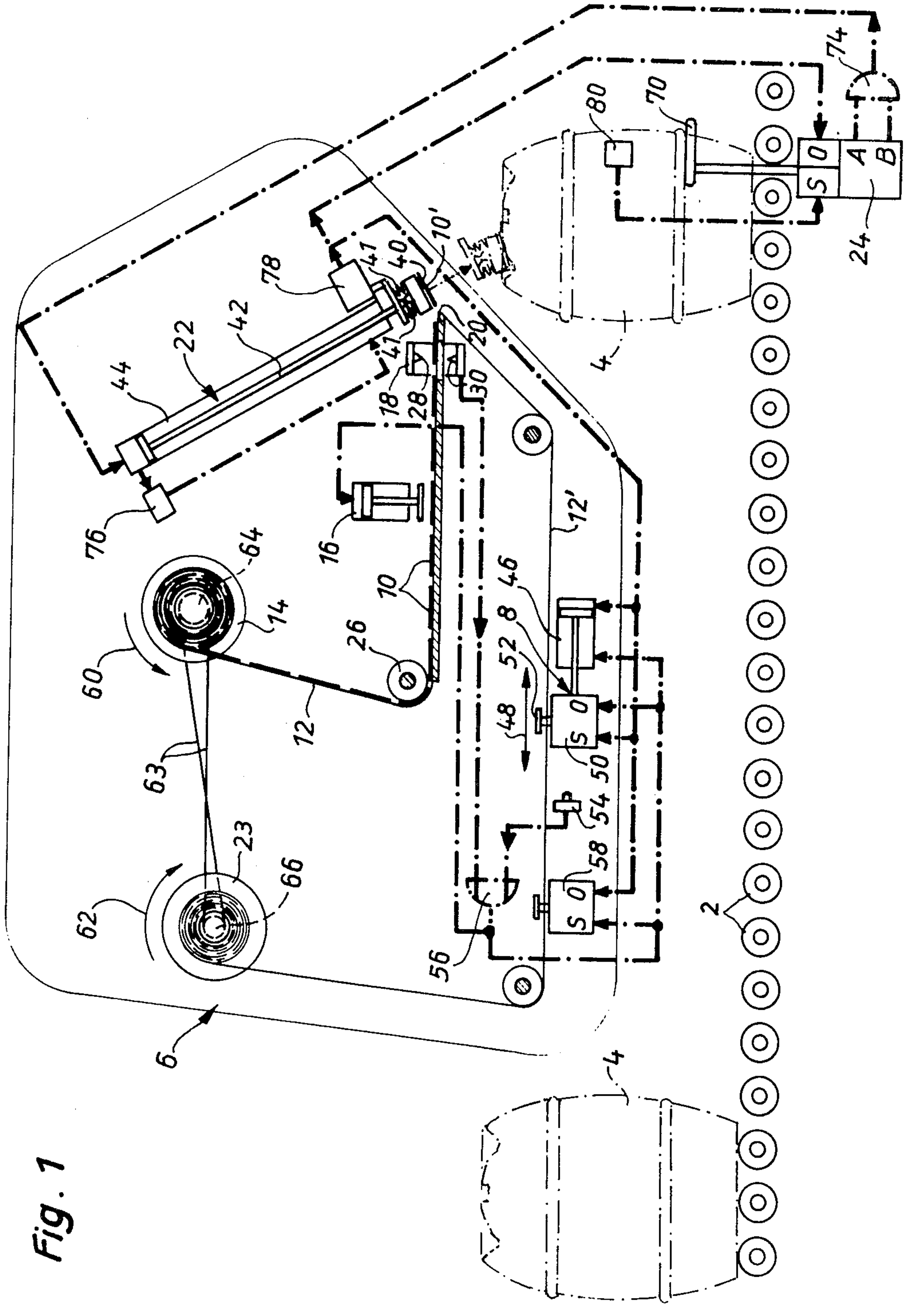

The invention relates to a labelling device for removing spaced self-adhesive labels from a label ribbon at a dispensing edge including an automatically tripped advancing mechanism, a sensing device controlling the advancing mechanism and a take-up for the empty label ribbon.

There is known a labelling device (German Offenlegungsschrift No. 25 16 195) which operates fully pneumatically and is primarily intended for the automatic operation in hazardous locations. In this case, the ribbon is advanced by means of advance rollers which are pressed together and against the label ribbon and can be driven by means of a pneumatic motor. The advancing mechanism is controlled through an air barrier which responds to control holes arranged in the label ribbon. Practice has shown that malfunctions occur again and again in the automatic operation of a labelling device of this type, because the air barrier does not respond, for example, because of missing or clogged control holes in the label ribbon. This may lead to multiple labelling or to the back-up of labels which may make it necessary to switch off the device and the conveying unit for the objects to be labelled. In addition, gear motors are provided for the advancing mechanism and also for a possible ribbon take-up; these gear motors are subjected to continuously alternating loads and, due to a susceptibility to wear which can be hardly avoided, require frequent maintenance, particularly in the case of continuous operation.

In another labelling device for label ribbons without control markings, it is known per se (U.S. Pat. No. 3,953,278) to use a ribbon clamping device as the advancing mechanism which can be moved back and forth in the advance direction by the spacing of the labels; this ribbon clamping device holds the ribbon during the forward motion and is open during the return motion. The control of the advancing mechanism is effected exclusively through a microswitch which is actuated by the passing objects to be labelled. While the advance distance of the ribbon clamping device can be adjusted to the label dimensions through an adjustable stop, since an orientation with the actual label dimension is missing during the advance motion, even slight deviations from the above-mentioned adjustment relative to the label spacing, particularly when a large number of labels are handled, can result in an undesirable incorrect labelling. These deviations are unavoidable in view of the manufacturing tolerances and the expansions of the label ribbon due to heat and moisture. The pull-off roll decelerated by a friction member is driven by the label ribbon which is pulled off, while the take-up roll for the empty label ribbon can be driven by means of a motor provided especially for this purpose. Behind the mobile ribbon clamping device as seen in advance direction, a stationary ribbon clamping device is arranged; the two ribbon clamping devices are operating in opposing cycles and the stationary ribbon clamping device has the purpose to prevent the ribbon from being pulled from the take-up roll during the return motion of the mobile ribbon clamping device. When operating with self-adhesive labels, it is unavoidable that traces of adhesive are transferred from the conveyor ribbon to the clamping jaws of the ribbon clamping devices where they gradually accumulate and cause the carrier ribbon to stick to the clamping jaws. While the mobile ribbon clamping device is able to free itself from an adhering adhesive ribbon during the return motion with open clamping jaws, this is not the case in the stationary ribbon clamping device, so that, due to the slackness of the carrier ribbon, a ribbon back-up may easily occur during the advance and, therefore, serious malfunctions may develop.

Therefore, the invention is based on the task of improving the known labelling device for removing spaced self-adhesive labels from a label ribbon at a dispensing edge including an automatically tripped advancing mechanism, a sensing device controlling the advancing mechanism and a take-up for the empty label ribbon, more particularly it is directed to a drive and control mechanism so that a fully automatic operation is ensured even when individual control markings are missing.

In accordance with the invention, the combination of the advancing mechanism, a switching member and a ribbon tensioning mechanism for the take-up roll is proposed for solving this task.

The advancing mechanism according to the invention with its linearly mobile ribbon clamping device by means of which the label advance can be controlled through the sensing device and through the redundant switching member, is preferably constructed as a mechanical limit switch valve, and ensures a trouble-free operation even when control markings in the label ribbon are occasionally missing. The ribbon tensioning mechanism acting on the pick-up roll and the return stop facilitate a reliable return motion of the ribbon clamping device without unintentionally causing the possibly adhering label ribbon to be also returned.

In accordance with a preferred embodiment of the invention, the ribbon tension required for a reliable operation is obtained by connecting the pick-up or take-up roll through a step-up gear unit including a slipping clutch to the pull-off roll which is driven essentially without slippage by the pulling label ribbon. For completely winding up the label ribbon on the take-up side even when the pull-off roll is full and the take-up roll is empty, the ratio of the step-up gear unit corresponds at least to the ratio between the ribbon winding diameters of the empty take-up roll and the full pull-off roll. When the take-up roll is gradually filling, the slippage of the slipping clutch, which is adjustable with respect to the torque to be transmitted, ensures that the label ribbon is continuously tensioned.

The step-up gear unit may be constructed as a belt drive, chain gearing or toothed gearing, while the slipping clutch can be formed by a slipping hub which engages the pull-off roll with the corresponding pulley or driven disk. On the side of the take-up roll, preferably a free wheel is provided as the return stop.

Figure 1A:
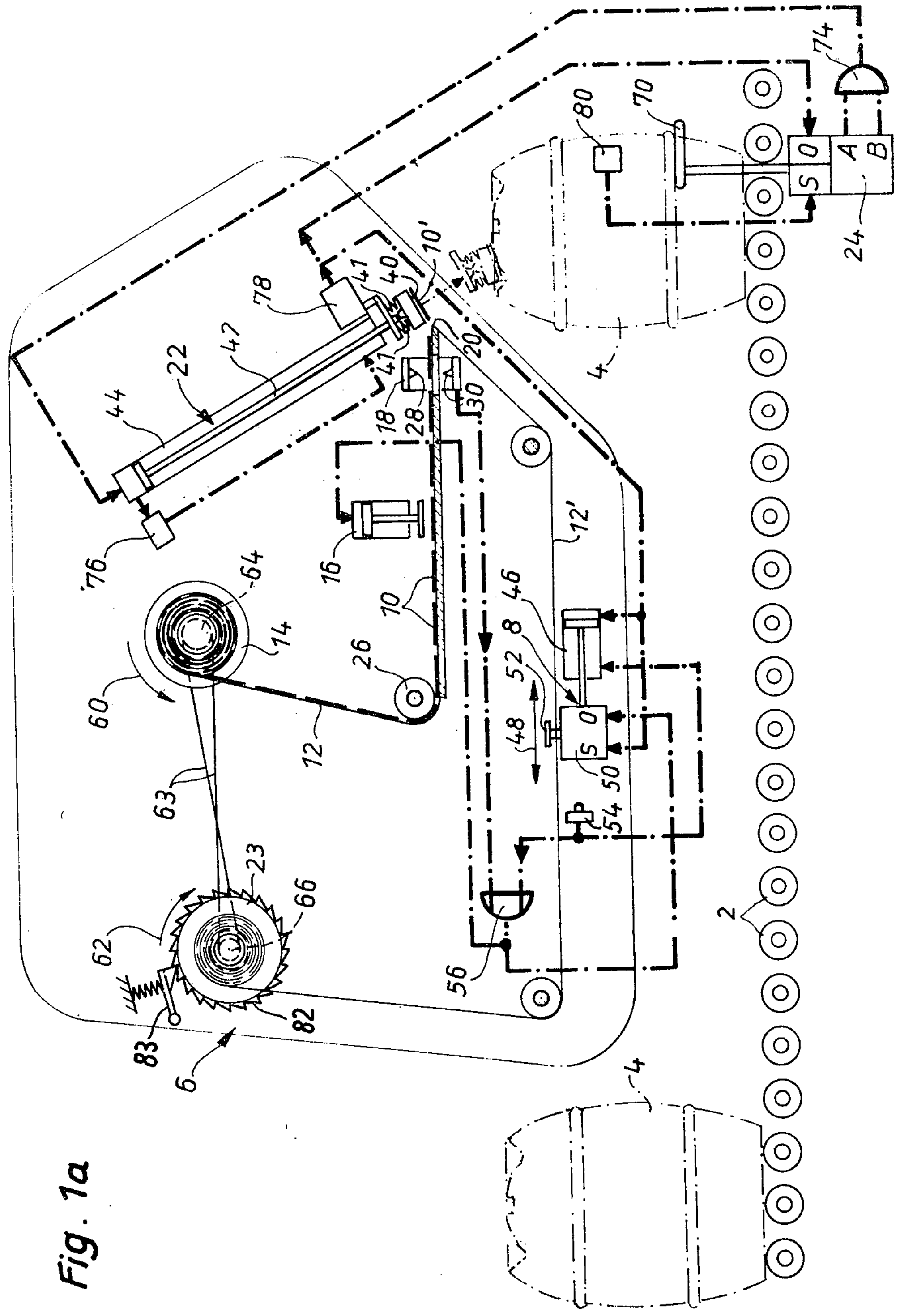
Figure 2D:
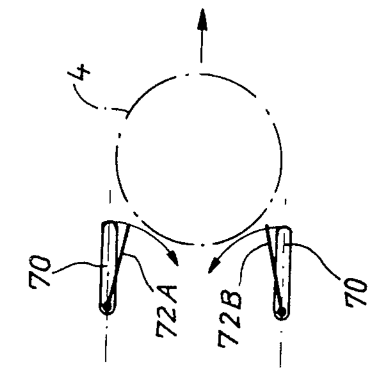
Figure 2C:
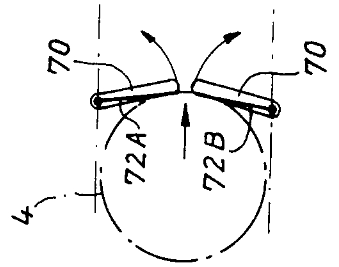
Figure 2B:
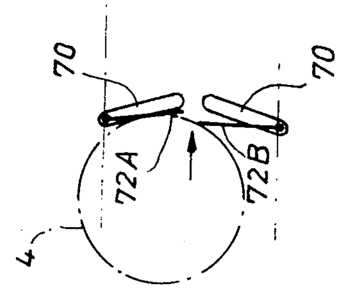
Figure 2A:
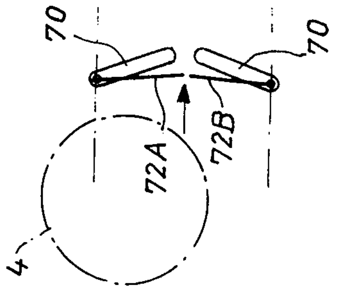
Figure 3:
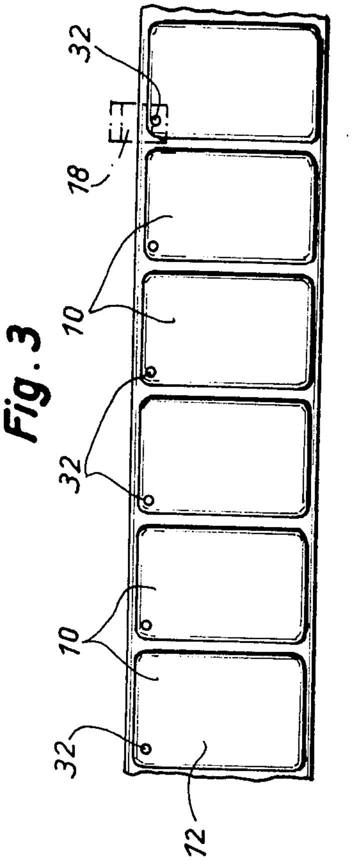

In the drawing, two advantageous embodiments of the invention are schematically illustrated. In the drawing:

FIG. 1 shows the essential components of a labelling plant for the automatic labelling of barrels by means of a labelling device according to the invention;

FIG. 1*a* shows a labelling plant with a labelling device which is modified as compared to FIG. 1;

FIGS. 2*a*–2*d* are top views of the barrel centering and tripping mechanism of the labelling plant according to FIG. 1 or 1*a* in different stages of operation;

FIG. 3 is a top view of a label ribbon.

The labelling plants schematically illustrated in the drawing consist essentially of a labelling device 6 arranged above a conveyor track 2 for conveying the objects 4 to be labelled. In the labelling device 6, by means of a pneumatically operated advancing mechanism 8, a ribbon 12 carrying self-adhesive labels 10 is pulled from a supply and pull-off roll 14, is pulled past a pneumatically operated printing apparatus 16, an air barrier 18, a dispensing edge 20 and a pneumatically operated pressing mechanism 22 and is wound onto a take-up roll 23. Tripping of the labelling procedure including the ribbon advance and the printing procedure is effected through a tripping mechanism 24 which is arranged in the region of the conveyor track and is mechanically actuated by the objects to be labelled.

In the illustrated embodiment, the objects to be labelled are beer barrels 4 which are conveyed upright on the roller track 2 and are to be labelled on the top as accurately as possible next to the bung hole.

The label ribbon 12 arriving from the pull-off roll 14 reaches the sensing device 18 via a guide roller 26 and the printing station 16. The sensing device 18 consists of an air barrier in which a transmitting nozzle 28 and a receiving nozzle 30 are arranged opposite each other on a fork-shaped member. For sensing by the air barrier, the label ribbon 12 has holes 32 with the spacing of the labels, as illustrated in FIG. 3. The label ribbon is advanced in a stepwise manner, wherein the length of the steps is normally controlled through the air barrier 18 by sensing the holes 32.

Behind the air barrier, as seen in the advancing direction, the label ribbon 12 with upwardly facing labels 10 reaches the sharp-edged dispensing edge 20 where it is deflected in such a way that the label 10′ arranged in the front on the ribbon is separated from the support and is moved forward a certain distance beyond the dispensing edge, while the empty carrier ribbon 12′ is pulled downwardly around the edge at an acute angle with the ribbon approaching the dispensing edge. The label 10′ being released is attracted by means of suction through the suction air openings in the free bottom surface of the plunger 40 of the pressing mechanism 22 and is held at this surface through the suction effect. The plunger 40 is arranged at the end of a piston rod 42 of a relatively long pneumatic cylinder 44.

The advancing mechanism 8 contains a pneumatic ribbon clamping device 50 which can be moved back and forth in the direction of double arrow 48 by means of a pneumatic cylinder 46. The ribbon clamping device 50 is controlled in such a way that, during its forward motion, the empty carrier ribbon 12′ is held and moved by pressing on the clamping jaw 52, while it is open during the return motion. The advancing distance of the label ribbon is usually controlled through the air barrier 18 which delivers a signal for opening the ribbon clamping device 50 when a hole 32 exists in the label ribbon. Experience has shown that, in the production of label ribbons, it happens again and again that individual holes 32 are not or in completely punched and, therefore, are not detected by the air barrier 18. To avoid malfunctions even in these cases, additionally a redundant limit pilot valve 54 is provided which is mechanically operated directly by the ribbon clamping device 50 and reverses the ribbon clamping device 50 after an adjustable advance distance has been reached. The input signals of the pilot valve 54 and of the air barrier 18 are linked together through an OR logic circuit 56.

In the embodiment illustrated in FIG. 1, behind the mobile ribbon clamping device 50 as seen in the advancing direction, a stationary ribbon clamping device 58 is arranged which is operated with an opposite cycle to the clamping device 50 and is supposed to ensure that the empty carrier ribbon 12′ freely reaches the take-up roll 23 during the advance and is not unintentionally moved again by the mobile ribbon clamping device 50 during the return motion of the latter. The symbols S and O characterize the inputs for closing and opening the two ribbon clamping devices and the two centering barriers 70 which are explained hereinbelow.

In the operation with self-adhesive labels, it is unavoidable that traces of adhesive are transferred from the carrier ribbon 12′ to the clamping jaws of the ribbon clamping devices 50,58; these traces of adhesive gradually accumulate at the clamping jaws and cause sticking between the clamping jaws and the carrier ribbon. While the mobile ribbon clamping device 50, during its return motion, is able to free itself from the possibly adhering carrier ribbon, this is not necessarily the case in the stationary ribbon clamping 58, so that, due to the slackness of the carrier ribbon, a ribbon back-up may easily occur during the advance of the ribbon and, therefore, serious malfunctions may develop.

To avoid such malfunctions, the stationary ribbon clamping device is omitted in the labelling device illustrated FIG. 1*a*. In its stead, a return stop 82,83 is provided on the take-up roll 23; the return stop 82,83 ensures that the carrier ribbon wound onto the take-up roll cannot be pulled off again. For simplicity's sake, the return stop is illustrated in FIG. 1*a* as a spring-loaded locking pawl 83 which engages in a peripheral toothing 82 of the take-up roll 23. However, a free wheel, not shown, facilitating a stepless winding is advantageously used as the return stop.

Another difference between the embodiments illustrated in FIGS. 1 and 1*a* resides in the manner of reversing the mobile ribbon clamping device: In the case of FIG. 1, the direction of motion is reversed simultaneously with the opening of the ribbon clamping device through the output signal of the OR-circuit 56; in the case of FIG. 1*a*, on the other hand, the direction of motion is reversed exclusively through the output signal of the limit pilot valve 54 after the ribbon clamping device has been opened, in the normal case, shortly previously through the air barrier by the control through the OR circuit and, thus, the ribbon advance has been interrupted. The latter arrangement provides a more reliable switching sequence during the reversal. In both cases, the advancing distance of the mobile ribbon clamping device to the limit pilot valve 54 is to be adjusted slightly greater than the label spacing on the carrier ribbon.

The pull-off roll 14 is driven essentially without slippage in the direction of arrow 60 by the label ribbon 12 pulled by the advancing mechanism 8. Through a slipping hub, not shown, the roll 14 is coupled to the pulley 64 which, in turn, is connected to the pulley 66 of the take-up roll 23 through a belt drive 63, so that the take-up roll is driven in the direction of arrow 62. The transmission ratio defined by the different diameters of the pullies 64 and 66 is chosen so that, when the pull-off roll 14 is full, the empty take-up roll 23 is driven with the angular velocity required for a tight winding. The above-mentioned sliding hub further ensures that a certain tension of the ribbon is continuously maintained during winding.

The labelling procedure is tripped through two pilot valves of the tripping mechanism 24 which are characterized by the symbols A and B and are actuated by two levers 72A, 72B which extend laterally into the roller track 2, are connected in an articulated manner to centering barriers 70 and can be pivoted toward the centering barriers by a barrel 40 which arrives on the driven roller track. The AND-circuit 74 has the effect that the labelling procedure is only tripped when the two pilot valves A,B are actuated simultaneously, which means that the barrel 40 is centered correctly. Subsequently, by moving the piston rod 42, the plunger 40 is initially moved obliquely downwardly until it strikes against the top of the barrel with its bottom surface carrying the self-adhesive label 10'. To be able to adjust to an inclination or a curvature of the top of the barrel during the pressure application, the plunger is pivotally coupled to a transverse axle of the piston rod and is connected to the latter through several helical springs 41 which can be compressed or expanded independently from one another; in its bottom portion, the plunger consists of an elastic material, for example, foam rubber. As soon as the desired contact pressure has been reached, the plunger 40 is again retracted into its initial position, while the self-adhesive label 10' adheres to the top of the barrel. The desired contact pressure is adjusted at a pressure pilot valve 76 to which the internal pressure of the cylinder 44 is admitted. In its upper end position, the plunger 40, through a member connected to the plunger, actuates a pilot valve 78 which controls the centering barriers 70, the pneumatic cylinder 46, the ribbon clamping device 50 of the advance mechanism 8 and, in the case of FIG. 1, the ribbon clamping device 58. At the same time, the labelled barrel 4 is released for the further transport by opening the centering barriers 70. The centering barriers 70 are closed again by means of a light barrier 80 which delivers a signal when the labelled barrel has left the region of the centering barriers. Also, the label ribbon 12 is advanced by a spacing of the holes while a new label 10' is peeled off for the plunger 40. Subsequently, the label 10 which has arrived under the printing apparatus 16 is printed on. The plant is then ready for another labelling procedure which is tripped by the next barrel.

We claim:

1. Labelling device, with a ribbon having self-adhesive labels removably arranged therein in spaced relationship and which can be pulled from a pull-off roll over a dispensing edge, an automatically tripped advancing mechanism arranged downstream of the dispensing edge in the advancing direction and movable in the forward advancing direction and in opposite return direction, a sensing device for controlling said advancing mechanism in response to control markings, such as holes, in said label ribbon, and a take-up roll for the empty label ribbon wherein the improvement comprises that said advancing mechanism includes a ribbon clamping device movable a greater distance in the advancing direction than the spacing between labels in the ribbon and holds the ribbon during the forward advancing motion and is open during the return motion, a switching member is located in the path of movement of and is actuated by said mobile ribbon clamping device and limits the movement of said ribbon clamping device in the forward advancing direction, an OR-logic circuit having inputs arranged to receive the output signals of said switching member and said sensing device through which output signals it is possible to trip the opening of said mobile ribbon clamping device, and a ribbon tensioning mechanism connected to said take-up roll acting in winding direction and a return stop for said take-up roll.

2. Device according to claim 1, wherein said ribbon tensioning mechanism comprises a step-up gear unit including a slipping clutch, said take-up roll being connected to said pull-off roll which is driven essentially without a slippage as said label ribbon is pulled off said pull-off roll, wherein the transmission ratio of said step-up gear unit corresponds at least to the diameter ratio defined by the empty take-up roll and the full pull-off roll.

3. Device according to claim 2, characterized in that said step-up gear unit comprises a belt drive.

4. Device according to claim 1 or 2, characterized in that said return stop is constructed as a free wheel.

5. Device according to claim 2, characterized in that said ribbon tensioning mechanism includes a pulley, and said slipping clutch comprises a slipping hub coupling said pull-off roll to said pulley.

6. Device according to one of claim 1, characterized in that the return motion of said mobile ribbon clamping device can be tripped by the input signal of said OR-logic circuit.

7. Device according to claim 1, characterized in that the return motion of said mobile ribbon clamping device can be tripped by the output signal of said switching member.

8. Device according to claim 1, characterized in that said ribbon clamping device being pneumatically operated and a pneumatic cylinder arranged for moving such ribbon clamping device back and forth.

9. Labelling device according to claim 1, characterized in that said switching member comprises a mechanically operated pneumatic limit pilot valve.

10. Device according to claim 1, characterized in that a stationary ribbon clamping device is arranged downstream of said mobile clamping device in the advancing direction and being operable in the opposing cycle of said mobile ribbon clamping device.

11. Device according to claim 2, characterized in that said step-up gear unit comprises a chain drive.

12. Device according to claim 2, characterized in that said step-up gear unit comprises a gear drive.

* * * * *

UNITED STATES PATENT OFFICE
CERTIFICATE OF CORRECTION

Patent No. 4,270,968 Dated June 2, 1981

Inventor(s) Windfried Dudzik and Joachim Dudzik

It is certified that error appears in the above-identified patent and that said Letters Patent are hereby corrected as shown below:

In the heading of the Patent [22] should read as follows:

[22] Filed: March 5, 1980

Signed and Sealed this

*Seventeenth* Day of *November 1981*

[SEAL]

*Attest:*

GERALD J. MOSSINGHOFF

*Attesting Officer* *Commissioner of Patents and Trademarks*